United States Patent [19]

Sejpka et al.

[11] Patent Number: 5,261,951
[45] Date of Patent: Nov. 16, 1993

[54] POLISHES FOR HARD SURFACES

[75] Inventors: Johann Sejpka, Marktl; Franz Wimmer, Burghausen; Annemarie Schmidt, Perach, all of Fed. Rep. of Germany

[73] Assignee: Wacker-Chemie GmbH, Munich, Fed. Rep. of Germany

[21] Appl. No.: 968,566

[22] Filed: Oct. 29, 1992

[30] Foreign Application Priority Data

Dec. 20, 1991 [DE] Fed. Rep. of Germany ....... 4142387

[51] Int. Cl.$^5$ ............ C09G 1/06; C09G 1/12; C09G 1/02
[52] U.S. Cl. ........................... 106/3; 106/10; 106/287.12; 106/287.13; 106/287.14; 427/287; 427/402
[58] Field of Search ........... 106/3, 10, 287.12, 287.13, 106/287.14, 287.16; 427/287, 402

[56] References Cited

U.S. PATENT DOCUMENTS

| 2,757,094 | 7/1956 | Guss | 106/8 |
| 4,218,250 | 8/1980 | Kasprzak | 106/3 |
| 4,246,029 | 1/1981 | Sanders, Jr. | 106/3 |
| 4,247,330 | 1/1981 | Sanders, Jr. | 106/3 |
| 4,273,584 | 6/1981 | D'Angelo et al. | 106/3 |
| 4,509,981 | 4/1985 | Sanders, Jr. et al. | 106/3 |
| 4,859,359 | 8/1989 | DeMatteo et al. | 106/3 |
| 4,936,914 | 6/1990 | Hurley et al. | 106/3 |
| 5,017,221 | 5/1991 | Legrow et al. | 106/3 |
| 5,039,724 | 8/1991 | Demlehner et al. | 524/267 |
| 5,074,912 | 12/1991 | Liles et al. | 106/287.16 |
| 5,112,393 | 5/1992 | Engel et al. | 106/287.16 |

FOREIGN PATENT DOCUMENTS 0200009 11/1986 European Pat. Off. .
0518555 12/1992 European Pat. Off. .
3836830 5/1990 Fed. Rep. of Germany .

Primary Examiner—Helene Klemanski

[57] ABSTRACT

Polishes for hard surfaces that are essentially free of organic solvent comprising organopolysiloxanes which are solid at room temperature.

9 Claims, No Drawings

POLISHES FOR HARD SURFACES

The invention relates to aqueous polishes which are essentially free of organic solvents and more particularly to aqueous polishes for hard surfaces which contain organopolysiloxanes.

BACKGROUND OF THE INVENTION

Polishes for hard surfaces, for example for automotive bodies, based on organopolysiloxanes are already known. For example, the review article by Engineer P. Preiss in Seifen - Öle -Fette - Wachse—vol. 102, No. 1/1976, page 20–22. In DE 3,409,320 A (Hoechst AG, issued on Sep. 19, 1985), an automotive polish is described which contains a salt of a long-chain fatty amine. In DE 3,616,575 A (Dow Corning Ltd., issued on Nov. 20, 1986) and the corresponding U.S. Pat. No. 4,743,648, a polish in the form of a water-in-oil emulsion is disclosed which contains a polydiorganosiloxane/-polyoxyalkylene copolymer. In U.S. Pat. No. 4,398,953 (Borden Inc., issued on Aug. 16, 1983), an oil-in-water emulsion containing silicone oil and amino-functional silicones is claimed as a polish. All of the above publications disclose the use of organic solvents.

However, measures for environmental protection, make it increasingly necessary to avoid organic solvents in chemical preparations. Moreover, organic solvents are often undesirable, due to their toxicological properties and their fire risk.

Therefore, it is an object of the present invention to provide organopolysiloxane-based polishes which are essentially free of organic solvents.

SUMMARY OF THE INVENTION

The foregoing object and others which will become apparent from the following description are accomplished in accordance with this invention, generally speaking, by providing polishes for hard surfaces which are essentially free of organic solvents and can be prepared using organopolysiloxanes which are solid at room temperature.

DETAILED DESCRIPTION OF THE INVENTION

The polishes of this invention preferably do not contain any organic solvents; however, it is possible for them to contain small amounts, such as for example, up to at most 2% by weight, based on the total weight of the polish, of organic solvent, such as, for example, a solvent which serves as a preservative.

The organopolysiloxanes which are used in this invention and are solid at room temperature and are preferably selected from the group consisting of (A) organopolysiloxanes which are solid at room temperature and comprise units of the formula

in which each R can be the same or different and represents monovalent hydrocarbon radicals, each $R^1$ can be the same or different and represents a hydrogen atom or a hydrocarbon radical, a is 0, 1, 2 or 3, with an average of from 0.75 to 1.5, and more preferably with an average of from 0.9 to 1.1, and b is 0, 1, 2 or 3, with an average of from 0.0 to 1.1 and more preferably with an average of from 0.01 to 0.07, with the proviso that the sum of a+b is smaller than or equal to 3, (B) linear organopolysiloxanes which are solid at room temperature and have the formula

in which each $R^2$ can be the same or different and represents monovalent hydrocarbon radicals and r is an integer having a value from 0 to 100, preferably from 0 to 70, with the proviso that at least one radical $R^2$ in formula (II) represents a hydrocarbon radical having at least 18 carbon atoms, and (C) cyclic organopolysiloxanes of the formula

in which each $R^3$ can be the same or different and represents a hydrocarbon radical.

It is understood, that room temperature means a temperature of 20° C.

The radical R is preferably a hydrocarbon radical having 1 to 18 carbon atom(s), in which the methyl radical is the preferred radical.

Examples of radicals R are alkyl radicals, such as the methyl, ethyl, n-propyl, iso-propyl, n-butyl, iso-butyl, tert-butyl, n-pentyl, iso-pentyl, neo-pentyl and tert-pentyl radicals; hexyl radicals such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; alkenyl radicals, such as the vinyl and allyl radicals; cycloalkyl radicals, such as the cyclo-pentyl, cyclohexyl and cycloheptyl radicals and methylcyclohexyl radicals; aryl radicals, such as the phenyl, naphthyl, anthryl and phenanthryl radicals; alkaryl radicals, such as o-, m- and p-tolyl radicals, xylyl radicals and ethylphenyl radicals; and aralkyl radicals, such as the benzyl radical and the α- and β-phenylethyl radicals.

The radical $R^1$ is preferably a hydrogen atom or a hydrocarbon radical having from 1 to 4 carbon atom(s), in which the methyl radical is the preferred radical.

Examples of hydrocarbon radicals represented by $R^1$ are the examples of hydrocarbon radicals having from 1 to 4 carbon atom(s) specified for R.

The preparation of the organopolysiloxanes which are used in this invention and are solid at room temperature is known and described, for example, in GB 685,173 A (issued on Dec. 31, 1951, Dow Corning Ltd.), U.S. Pat. No. 2,842,521 (issued on Jul. 8, 1958, Wacker-Chemie GmbH), FR 1,475,709 A (issued on Apr. 7, 1967, General Electric Co.), U.S. Pat. No. 3,668,180 (issued on Jun. 6, 1972, Stauffer-Wacker-Silicone Corp.) U.S. Pat. No. 3,792,071 (issued on Feb. 12, 1974, Wacker-Chemie GmbH), U.S. Pat. No. 3,846,358 (issued on Nov. 5, 1974, General Electric Co.) and U.S. Pat. No. 4,298,753 (issued on Nov. 3, 1981, Wacker-Chemie GmbH).

The organopolysiloxanes which are solid at room temperature and comprise units of formula (I) are preferably organopolysiloxanes containing ($RSiO_{3/2}$) units and organopolysiloxanes containing ($R_3SiO_{\frac{1}{2}}$) and ($SiO_{4/2}$) units where R is the same as above.

The radical $R^2$ is preferably a hydrocarbon radical having from 1 to 20 carbon atom(s).

Examples of radicals represented by $R^2$ are alkyl radicals, such as a methyl, ethyl, n-propyl, iso-propyl, n-butyl, iso-butyl, tert-butyl, n-pentyl, iso-pentyl, neopentyl and tert-pentyl radicals; hexyl radicals such as the n-hexyl radical; heptyl radicals, such as the n-heptyl radical; octyl radicals, such as the n-octyl radical and iso-octyl radicals, such as the 2,2,4-tri-methylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; n-eicosyl radical, alkenyl radicals, such as the vinyl and allyl radicals; cycloalkyl radicals, such as the cyclopentyl, cyclohexyl and cycloheptyl radicals and methylcyclohexyl radicals; aryl radicals, such as the phenyl, naphthyl, anthryl and phenanthryl radicals; alkaryl radicals, such as o-, m-and p-tolyl radicals, xylyl radicals and ethylphenyl radicals; and aralkyl radicals, such as the benzyl radical and the $\alpha$- and $\beta$-phenylethyl radicals.

Preferably, $R^2$ is a methyl radical or an n-octadecyl radical.

Although formula (II), does not disclose the presence of other siloxane units, up to 10 mol percent of the diorganosiloxane units can be replaced by other siloxane units, which in most cases are present only as impurities, but are more or less difficult to avoid, such as $R^2{}_3SiO_{\frac{1}{2}}$, $R^2SiO_{3/2}$ and $SiO_{4/2}$ units, in which $R^2$ is the same as above.

Preferably from 10 to 50%, and more preferably from 25 to 50%, and in particular from 35 to 50%, of the number of $R^2$ radicals in the organopolysiloxane of formula (II) are hydrocarbon radicals having at least 18 carbon atoms. The remaining radicals are preferably methyl radicals, since those are more readily available.

Examples of organopolysiloxanes of formula (II) which are used in this invention and are solid at room temperature are n—$C_{18}H_{37}(CH_3)_2SiO[(CH_3)_2SiO]_m$-Si$(CH_3)_2$n—$C_{18}H_{37}$, in which m is 0 or a number from 1 to 8, and $(CH_3)_3SiO$—$[CH_3Si(n$—$C_{18}H_{37})O]_o[(CH_3)_2SiO]_p$—Si$(CH_3)_3$, in which o is a number of from 1 to 65 and p is a number of from 1 to 60, with the proviso that o is greater than or equal to p.

Preferably, the organopolysiloxanes of formula (II) which are used in this invention and are solid at room temperature are $(CH_3)_3SiO$—$[CH_3si$—$(n$—$C_{18}H_{37})O]_o$—Si$(CH_3)_3$, in which o is a number of from 55 to 65.

The organopolysiloxanes of formula (II) which are used in this invention and are solid at room temperature have a molecular weight of, preferably, at least 1,000, and more preferably from 10,000 to 20,000.

The organopolysiloxanes of formula (II) which are used in this invention and are solid at room temperature preferably have a wax-like consistency and a melting point of between 30° and 60° C.

Organopolysiloxanes of formula (II) which are solid at room temperature and processes for their preparation are well known in the art.

The radical $R^3$ is preferably a hydrocarbon radical having from 1 to 4 carbon atom(s), in which the methyl radical is the preferred radical.

Examples of radical $R^3$ are the examples of hydrocarbon radicals having 1 to 4 carbon atom(s) specified for R.

The organopolysiloxane of formula (III) is preferably hexamethylcyclotrisiloxane.

The polishes of this invention are preferably prepared using organopolysiloxanes which are solid at room temperature and comprise units of formula (I) or organopolysiloxanes of formula (II) which are solid at room temperature or mixtures thereof.

To prepare the polishes of this invention, the organopolysiloxanes which are solid at room temperature are used in amounts of, preferably, from 0.1 to 5.0% by weight, and more preferably from 0.5 to 2.0% by weight, based on the total weight of the polish of this invention.

Preferably, the polishes of this invention are prepared by using organopolysiloxanes which are solid at room temperature in the form of an aqueous emulsion. Aqueous emulsions of organopolysiloxanes which are solid at room temperature are already known. See, for example, CA-A 1,205,937, (issued Jun. 10, 1986, F. Traver, General Electric Co.) and DE 3,836,830 A (Wacker-Chemie GmbH; issued May 17, 1990) and corresponding US Pat. No. 5,039,724, (issued Aug. 13, 1991).

If an organopolysiloxane which is solid at room temperature and contains units of formula (I) is used in preparing the polishes of this invention, the emulsion is preferably prepared by the procedure described in the publication DE 3,836,830 A, cited above. According to this publication, the organopolysiloxane which is solid at room temperature and contains units of formula (I) is dissolved in a low-molecular-weight organopolysiloxane which is liquid at room temperature, and the solution is emulsified using water and adding an emulsifier and, if desired, additional substances. The solution of the organopolysiloxane which is solid at room temperature in the organopolysiloxane which is liquid at room temperature and the emulsifying step can be carried out in mixing apparatuses which are generally used in the preparation of emulsions.

The low-molecular-weight organopolysiloxane preferably used is liquid at room temperature and comprises units of the general formula

$$R^4{}_c(R^5O)_dSiO_{(4-c-d)/2} \qquad (IV)$$

in which each $R^4$ is the same or different and is the same as R, each $R^5$ is the same or different and is the same as $R^1$, c is 0, 1, 2, or 3, with an average of from 0 to 2, and more preferably with an average of from 1 to 2, d is 0, 1, 2 or 3, with an average of from 0 to 2, and more preferably with an average of from 0 to 1, with the proviso that the sum of c+d is less than or equal to 3.

These low-molecular-weight organopolysiloxanes which are liquid at room temperature and contain units of formula (IV) preferably have 2 to 6 Si atoms per molecule and a viscosity at 25° C. of, preferably, 0.65 to 7.00 mm$^2$/s, and more preferably from 2.00 to 4.00 mm$^2$/s.

Examples of low-molecular-weight organopolysiloxanes which are liquid at room temperature are octamethylcyclotetrasiloxane, decamethylcyclopentasiloxane, octaphenylcyclotetrasiloxane, tetraethoxytetramethylcyclotetrasiloxane and hexamethyldisiloxane, in which octamethylcyclotetrasiloxane, decamethylcyclopentasiloxane and hexamethyldisiloxane are preferred and octamethylcyclotetrasiloxane and hexamethyldisiloxane are more preferably used.

To prepare the aqueous emulsion used in this invention, the organopolysiloxanes which are solid at room temperature and the low-molecular-weight organopolysiloxane which is liquid at room temperature are preferably used in amounts of from 25 to 90% by weight, and more preferably from 35 to 65% by weight, and in particular from 40 to 60% by weight, based on the total weight of the organopolysiloxane which is solid at room temperature and contains units of formula (I).

In the preparation of the aqueous emulsions used in this invention, containing organopolysiloxanes which are solid at room temperature, any known ionic and non-ionic emulsifiers which have been or could have been used heretofore to prepare stable aqueous emulsions of organopolysiloxanes can be used as emulsifiers either individually or as mixtures of various emulsifiers. It is also possible to use those emulsifiers such as described in DE 3,613,384 C and corresponding U.S. Pat. No. 4,757,106. Preferably, nonionic and cationic emulsifiers are used. Of these, fatty alcohol polyglycol ethers, nonylphenol polyglycol ethers, tri-n-butylphenol polyglycol ethers and quaternary ammonium salts of saturated and unsaturated fatty acids are preferably used.

The aqueous emulsions used in this invention containing organopolysiloxanes which are solid at room temperature and contain units of formula (I) contain the emulsifier in amounts of, preferably, from 2 to 8% by weight, and more preferably from 3 to 5% by weight based on the total weight of the organopolysiloxane which is solid at room temperature and the organopolysiloxane which is liquid at room temperature.

The aqueous emulsions used in this invention containing the organopolysiloxanes which are solid at room temperature and contain units of formula (I), have a solids content of, preferably from 10 to 50% by weight, and more preferably from 15 to 42% by weight, based on the total weight of the emulsion.

If an organopolysiloxane of formula (II) which is solid at room temperature is used for preparing the polishes of this invention, the emulsion is advantageously prepared by melting the organopolysiloxane of the formula (II) which is solid at room temperature and emulsifying it in liquid form using water and an emulsifier and, if desired, additional substances.

The temperature necessary for melting depends on the organopolysiloxane used of formula (II) and is preferably between 20° and 60° C., and more preferably between 40° and 50° C.

The melt is emulsified by processes known in the art. The emulsifiers which can be used are the emulsifiers already described above, of which fatty alcohol polyglycol ether and nonylphenol polyglycol ether are preferred and fatty alcohol polyglycol ether is particularly preferred.

The aqueous emulsions used in this invention comprising organopolysiloxanes of formula (II) which are solid at room temperature, contain an emulsifier in amounts of, preferably, from 3 to 10% by weight, and more preferably from 4 to 6% by weight, based on the total weight of the organopolysiloxane which is solid at room temperature.

The aqueous emulsions of this invention containing the organopolysiloxanes of formula (II) which are solid at room temperature have a solids content of, preferably from 25 to 50% by weight, and in particular from 30 to 45% by weight, based on the total weight of the emulsion.

Emulsions containing organopolysiloxanes of formula (II) which are solid at room temperature can of course also be prepared by the procedure of DE 3,836,830 A, described above for organopolysiloxanes comprising units of formula (I); however, this is not the preferred procedure.

If an organopolysiloxane of formula (III) which is solid at room temperature is used in the preparation of the polishes of this invention, the preparation of the emulsion is preferably carried out in accordance with the procedure described above for the organopolysiloxane of formula (II).

Furthermore, it is possible to use organopolysiloxanes which are liquid at room temperature for preparing the polish of this invention. These organopolysiloxanes can be low-molecular-weight organopolysiloxanes containing units of formula (IV), preferably those having a viscosity at 25° C. of from 0.65 to 7.00 mm$^2$/s and more preferably those having a viscosity of 2.00 to 4.00 mm$^2$/s.

The organopolysiloxanes which are liquid at room temperature are preferably used in the form of an aqueous emulsion. It is possible to emulsify them individually by processes known in the art. The emulsions of organopolysiloxanes which are liquid at room temperature preferably have a solids content of from 10 to 60% by weight, and more preferably from 30 to 45% by weight, and an emulsifier content of preferably from 2 to 10% by weight, and more preferably from 3 to 6% by weight, based on the total weight of the emulsion.

The organopolysiloxanes which are liquid at room temperature can also be emulsified together with the organopolysiloxanes used according to this invention which are solid at room temperature, by the procedure described above.

If an organopolysiloxane which is liquid at room temperature is additionally used for preparing the polishes of this invention, it is preferably used in amounts of from 0.1 to 2.0% by weight, and more preferably from 0.1 to 1% by weight, based on the total weight of the polish.

Depending on the intended use, the polish of this invention can contain additives, such as, for example, non-silicon-containing waxes, thickeners, abrasives, preservatives and additives.

Examples of non-silicon-containing waxes are natural waxes of vegetable origin, such as carnauba wax and candelilla wax, montanic acid and montanic ester waxes, partially oxidized synthetic paraffins, polyethylene waxes, polyvinyl ether waxes and wax containing metallic soap, of which carnauba wax, paraffin waxes and polyethylene waxes are preferred and paraffin waxes are particularly preferred.

If waxes are used for preparing the polish of this invention, they are preferably used in amounts of from 0.1 to 2.0% by weight, and more preferably from 0.1 to 1.0% by weight, based on the total weight of the polish.

Examples of thickeners are homopolysaccharides, heteropolysaccharides, polyacrylates, carboxy- and hydroxymethylcellulose, of which polysaccharides and polyacrylates are preferred and polysaccharides are particularly preferred.

If thickeners are used for preparing the polish of this invention, they are preferably used in amounts of from 0.1 to 1.5% by weight, and more preferably from 0.3 to 0.6% by weight, based on the total weight of the polish.

Examples of abrasives are polishing clay, so-called siliceous chalk, pyrogenic silica and natural kieselguhr, such as, for example, "Snow Floss" from Lehmann & Foss, of which siliceous chalk and polishing clay are particularly preferred.

If abrasives are used for preparing the polish of this invention, they are preferably used in amounts of from 1 to 10% by weight, and more preferably from 3 to 5% by weight, based on the total weight of the polish.

Examples of preservatives are formaldehyde, parabenes, benzyl alcohol, salicylic acid and salts thereof, benzoic acid and salts thereof and isothiazolinones, of which formaldehyde and isothiazolinones are preferred and formaldehyde is particularly preferred.

If preservatives are used for preparing the polish of this invention, they are preferably used in amounts of from 0.01 to 0.30% by weight, and more preferably from 0.05 to 0.10% by weight, based on the total weight of the polish.

Examples of additives are scents and dyes.

If additives are used for preparing the polish of this invention, they are preferably used in amounts of from 0.01 to 0.20% by weight, and more preferably from 0.05 to 0.10% by weight, based on the total weight of the polish.

From each of the groups of substances mentioned above as a possible component for the aqueous polishes of this invention, one substance of this group or a mixture of at least two different substances of this group can be used as a single component in the polishes of this invention.

The polishes of this invention contain water, preferably in amounts of from 85 to 99.9% by weight, and more preferably from 93 to 99.5% by weight, based on the total weight of the polish. Preferably demineralized water is employed in the polishes of this invention.

The individual components of the polish of this invention can be mixed with one another in any desired manner. Thus, for example, the additives can be admixed with the organopolysiloxane which is solid at room temperature before the emulsifying step. However, the additives are preferably mixed with the finished emulsions of organopolysiloxanes which are solid at room temperature and, if desired, of organopolysiloxanes which are liquid at room temperature.

The emulsifying or mixing of the components usable for preparing the polishes of this invention is preferably carried out at a temperature of from 20° C. to 50° C. and the pressure of the surrounding atmosphere, i.e., between 900 and 1100 hPa. However, it is also possible to use higher or lower temperatures and higher or lower pressures. The emulsifying step can take place in conventional mixing apparatuses suitable for the preparation of emulsions, such as high-speed stator/rotor stirrers of the Professor P. Willems type, such as known under the registered trademark "Ultra-Turrax".

The room temperature consistency of the polishes of this invention ranges from that of a thin liquid to that of a creamy paste.

The polishes of this invention have an emulsion stability of at least two years when properly stored at room temperature.

The present invention also relates to a process for the polishing treatment of hard surfaces, which comprises applying the polish of this invention to a hard surface.

In the process of this invention, the polish of this invention is applied by spraying, dipping or using a fabric such as cotton or wool, or a sponge, and rubbed in. The polish of this invention has the advantage that it can be easily applied and readily rubbed in.

The hard surfaces to be treated are in particular metallic surfaces, coated surfaces and plastic surfaces. The polish of this invention is highly suitable for the treatment of automotive bodies.

The polishes of this invention have the advantage that they do not contain any organic solvent or contain an organic solvent only in extremely small amounts, for example as preservative.

A further advantage is that excellent weathering and washing resistance can be achieved by means of the polishes of this invention. In order to achieve this effect, it is sufficient to use even small amounts of organopolysiloxanes which are solid at room temperature in preparing the polishes of this invention.

Moreover, the polishes of this invention have the advantage that they are nonflammable, easy to apply and give the treated solid surfaces high color depth and gloss.

In the following examples, all parts and percentages are by weight unless otherwise specified. Furthermore, all viscosities refer to a temperature of 25° C. Unless otherwise stated, the following examples were carried out at the pressure of the surrounding atmosphere, i.e., about 1000 hPa, and at room temperature, i.e., at about 20° C., or at a temperature which is attained upon combining the reactants at room temperature without additional heating or cooling.

The contact angles were determined in the following manner: a water droplet having a volume of 0.01 ml is applied to the surface to be tested from a height of 15 mm, and the angle of contact is determined by means of a goniometer (type 100-10 from Rame-Hart Inc., New Jersey, USA). The measurement is repeated 4 times, and the average value of the 5 measurements is determined. The measurement of the contact angle on the untreated substrate is used as the blank reading.

In the following examples Me represents the methyl radical and Et represents the ethyl radical.

EXAMPLE 1

(A) About 50 parts of an organopolysiloxane which is solid at room temperature and has the formula $MeSiO_{1.47}(OEt)_{0.06}$ and a molecular weight of 4000 are dissolved in 50 parts of octamethylcyclotetrasiloxane. The resulting mixture has a viscosity of about 150 mm$^2$/s.

About 20 g of a fatty alcohol polyglycol ether emulsifier (commercially available from Hoechst AG under the name "Arkopal") are added to 175 g of this organopolysiloxane solution and stirred. This mixture is then emulsified by means of an emulsifying apparatus by adding 305 g of deionized water with constant stirring. The resultant aqueous emulsion of an organopolysiloxane which is solid at room temperature has a solids content of 20% by weight, based on the total weight of the emulsion.

(B) About 25 g of a fatty alcohol polyglycol ether emulsifier (commercially available from Hoechst AG under the name "Genapol") are added to 175 g of an organopolysiloxane solution of the formula $Me_3SiO[MeSi(n-C_{18}H_{37})O]_{60}SiMe_3$ and stirred. This mixture is then emulsified by means of an emulsifying apparatus by adding 300 g of deionized water with constant stirring. The resultant aqueous emulsion of an organopolysiloxane which is solid at room temperature has a solids content of 38% by weight, based on the total weight of the emulsion.

(C) About 15 g of a fatty alcohol polyglycol ether emulsifier (commercially available from Hoechst AG under the name "Genapol") are added to 175 g of trimethylsiloxy-terminated dimethylpolysiloxane having a viscosity of 350 mm$^2$/s (commercially available from Wacker-Chemie GmbH, Munich under the name "AK 350") and stirred. This mixture is then emulsified by means of an emulsifying apparatus by adding 310 g of deionized water with constant stirring. The resultant aqueous emulsion of an organopolysiloxane which is solid at room temperature has a solids content of 37% by weight, based on the total weight of the emulsion.

About 1.0 g of the emulsion described in (A) above, 2.0 g of the emulsion described in (B) above, 2.0 g of the emulsion described in (C) above, 94.6 g of demineralized water and 0.1 g of a 40% formalin solution are mixed together, and 0.3 g of heteropolysaccharide (commercially available from Jungbunzlauer Xanthan GmbH, A-Vienna, under the name "Xanthan") is added to this mixture with stirring.

The resultant polish is applied to the body of an automobile having a blank reading of 66° using cotton cloth and rubbed in. After standing for 15 minutes at room temperature, a contact angle of 99° is measured. The treated substrate is then sprayed, likewise at room temperature, 4 times, each time with 10 l of tap water having a temperature of about 6° C. per 100 cm² of substrate at a distance of 20 cm, for 15 minutes each time. The contact angles are shown in Table 1.

TABLE 1

| Spraying time [min] | Contact Angle |
|---|---|
| 15 | 95° |
| 30 | 95° |
| 45 | 95° |
| 60 | 91° |

EXAMPLE 2

About 3.0 g of the emulsion described in Example 1 (A) above, 6.0 g of an emulsion of montan wax in water (commercially available from Hoechst AG under the name "KSE"; solids content: 12%), 91.9 g of demineralized water and 0.1 g of isothiazolinone are mixed together.

The polish thus obtained is applied to the coated body of an automobile having a blank reading of 67° using a cloth and rubbed in.

After standing for 15 minutes at room temperature, a contact angle of 94° is measured. The treated substrate is then sprayed, likewise at room temperature, 4 times, each time with 10 l of tap water having a temperature of about 6° C. per 100 cm² of substrate from a distance of 20 cm, for 15 minutes each time. The contact angles are listed in Table 2.

TABLE 2

| Spraying time [min] | Contact Angle |
|---|---|
| 15 | 93° |
| 30 | 89° |
| 45 | 87° |
| 60 | 85° |

EXAMPLE 3

About 1.0 g of the emulsion described in Example 1 (A) above, 2.0 g of the emulsion described in Example 1 (B) above, 1.0 g of the emulsion described in Example 1 (C) above, 6.0 g of an emulsion of montan wax in water (commercially available from Hoechst AG under the name "KSE"; solids content: 12%), 86.5 g of demineralized water, 3 g of siliceous earth from Neuburg (commercially available from Hoffmann Mineral, Neuburg/Germany under the name "Silitin") and 0.5 g of heteropolysaccharide (commercially available from Jungbunzlauer Xanthan GmbH, A-Vienna, under the name "Xanthan") are mixed together. A polish in the form of a thick liquid is obtained. The resultant polish is applied to the coated body of an automobile having a blank reading of 66. using a cloth and rubbed in.

After standing at room temperature for 15 minutes, a contact angle of 91° is measured. The treated substrate is then sprayed, likewise at room temperature, 4 times, each time with 10 l of tap water having a temperature of about 6° C. per 100 cm² of substrate from a distance of 20 cm, for 15 minutes each time. The contact angles are listed in Table 3.

TABLE 3

| Spraying time [min] | Contact Angle |
|---|---|
| 15 | 82° |
| 30 | 81° |
| 45 | 80° |
| 60 | 79° |

What is claimed is:

1. A polish for hard surfaces which is essentially free of an organic solvent, comprising organopolysiloxanes which are solid at room temperature selected from the group consisting of (A) organopolysiloxanes having units of the formula $$R_a(R^1O)_b SiO_{(4-a-b)/2} \qquad (I)$$

in which R represents a monovalent hydrocarbon radical having from 1 to 18 carbon atoms, $R^1$ represents a hydrogen atom or a hydrocarbon radical having from 1 to 4 carbon atoms, a is 0, 1, 2 or 3, with an average of from 0.75 to 1.5, and b is 0, 1, 2 or 3, with an average of from 0.0 to 1.1 with the proviso that the sum of a+b is less than or equal to 3, (B) linear organopolysiloxanes which are solid at room temperature and having the formula $$R^2_3SiO(SiR^2_2O)_rSiR^2_3 \qquad (II)$$

in which $r^2$ represents a monovalent hydrocarbon radical having from 1 to 20 carbon atoms and r is an integer having a value of from 0 to 100, with the proviso that at least one radical $R^2$ in formula (II) is a hydrocarbon radical having at least 18 carbon atoms, and (C) cyclic organopolysiloxanes of the formula $$(R^3_2SiO)_3 \qquad (III)$$

in which $R^3$ represents a hydrocarbon radical having from 1 to 4 carbon atoms.

2. The polish of claim 1, wherein the organopolysiloxanes which are solid at room temperature are used in amounts of from 0.1 to 5.0% by weight, based on the total weight of the polish.

3. The polish of claim 1, wherein the organopolysiloxanes which are solid at room temperature are used in the form of an aqueous emulsion.

4. The polish of claim 1, wherein organopolysiloxanes which are liquid at room temperature are also present.

5. The polish of claim 1, wherein the polish contains additional substances selected from the group consisting of non-silicon-containing waxes, thickeners, abrasives, preservatives and additives, selected from the group consisting of odorous substances and dyes.

6. The polish of claim 1, wherein the polish contains water in an amount of from 85 to 99.9% by weight, based on the total weight of the polish.

7. The polish of claim 1, which is free of organic solvents.

8. A process for treating hard surfaces, with a polish which comprises applying the polish of claim 1 to the hard surface.

9. The process of claim 8, wherein the hard surface is selected from the group consisting of metallic surfaces, coated surfaces and plastic surfaces.

* * * * *